(12) United States Patent
Park

(10) Patent No.: US 7,519,380 B2
(45) Date of Patent: Apr. 14, 2009

(54) METHOD FOR RECEIVING MULTIPLE SMS MESSAGES COMBINED TO MAKE AN MMS MESSAGE IN A TELECOMMUNICATION SYSTEM

(75) Inventor: Hee-La Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 141 days.

(21) Appl. No.: 10/824,360

(22) Filed: Apr. 15, 2004

(65) Prior Publication Data

US 2004/0209631 A1 Oct. 21, 2004

(30) Foreign Application Priority Data

Apr. 16, 2003 (KR) .................. 10-2003-0024060

(51) Int. Cl.
  *H04Q 7/20* (2006.01)
(52) U.S. Cl. .................................... 455/466
(58) Field of Classification Search ............ 455/414.3, 455/414.2, 414.4, 466; 709/237; 370/522; 707/10
  See application file for complete search history.

(56) References Cited

U.S. PATENT DOCUMENTS

| | | | |
|---|---|---|---|
| 6,885,872 B2 * | 4/2005 | McCann et al. ............. | 455/466 |
| 6,892,066 B2 * | 5/2005 | Detweiler et al. ......... | 455/414.4 |
| 6,895,251 B2 * | 5/2005 | Soh et al. ................ | 455/466 |
| 2001/0041578 A1 * | 11/2001 | Na .......................... | 455/466 |
| 2001/0053687 A1 * | 12/2001 | Sivula ..................... | 455/412 |
| 2002/0006797 A1 * | 1/2002 | Virtanen et al. .......... | 455/445 |
| 2002/0078228 A1 | 6/2002 | Kuisma et al. ............ | 709/237 |
| 2002/0087549 A1 | 7/2002 | Mostafa ................... | 707/10 |
| 2002/0126708 A1 | 9/2002 | Skog et al. ............... | 370/522 |
| 2002/0132608 A1 * | 9/2002 | Shinohara ................. | 455/412 |
| 2003/0040300 A1 * | 2/2003 | Bodic et al. .............. | 455/412 |
| 2004/0097248 A1 * | 5/2004 | Schmidt et al. ............ | 455/466 |
| 2004/0121818 A1 * | 6/2004 | Paakkonen ................. | 455/567 |
| 2004/0147284 A1 * | 7/2004 | Laumen et al. ............ | 455/558 |
| 2004/0185883 A1 * | 9/2004 | Rukman .................... | 455/466 |

FOREIGN PATENT DOCUMENTS

EP 1 161 109 12/2001

(Continued)

*Primary Examiner*—Lester Kincaid
*Assistant Examiner*—Diego Herrera
(74) *Attorney, Agent, or Firm*—KED & Associates, LLP

(57) ABSTRACT

A method is provided for receiving a wireless message in a mobile telecommunication system. This may include a mobile station (MS) receiving a wireless message. A judgment may be made whether the received message is a general SMS message or a SMS message for a MMS. The message may be directly stored if the received message is a general SMS message. The user may then be informed of a message reception. The RR connection may be released when the received message is a SMS message for a MMS. A flag setting may then be performed. The RR may be reconnected and the second message may be received. These options may be repeated until the second message is received. The two SMS messages may be decoded and formed into one message when the second message for a MMS is received. The message may be stored, decoded and the user may be informed of a message reception. The RR connection may be released, the flag setting may be changed and a RAU processing may be performed.

21 Claims, 2 Drawing Sheets

FOREIGN PATENT DOCUMENTS

| | | |
|---|---|---|
| EP | 1271970 | 1/2003 |
| EP | 1 335 619 | 8/2003 |
| JP | 2002281550 | 9/2002 |
| WO | WO 0133781 | 5/2001 |
| WO | WO 0133782 | 5/2001 |
| WO | WO 0211398 | 2/2002 |
| WO | WO 03/041025 | 5/2003 |

* cited by examiner

METHOD FOR RECEIVING MULTIPLE SMS MESSAGES COMBINED TO MAKE AN MMS MESSAGE IN A TELECOMMUNICATION SYSTEM

The present disclosure claims priority from Korean Patent Application No. 24060/2003, filed Apr. 16, 2003, the subject matter of which is incorporated herein by reference.

BACKGROUND OF THE INVENTION

1. Field of the Invention

Embodiments of the present invention may relate to a method for receiving a wireless message in a mobile telecommunication system. More particularly, embodiments of the present invention may relate to a method for receiving a wireless message in a Global Service for Mobile Telecommunication (GSM) network or a General Packet Radio Service (GPRS) network.

2. Background of the Related Art

A short message service (SMS) is a service generated as mobile communication networks advance into digital methods and thereby digital data is also transmitted into the mobile communication networks such as between a base station and a mobile station (SMS). SMS is generally similar in function as a service of an interactive wireless calling, and may include a voice mailbox alarm of a mobile telephone system, a simple message transmission/reception, a life information service using a uni-directional communication concept, and an order type information service using a consecutive message transmission/reception. Message reception in a mobile terminated (MT) SMS is a fundamental service. When a message is accurately transmitted to the subscriber's MS by a point-to-point method, the message center (MC) completes a transmission operation for a specific message.

On the other hand, a SMS message may include a SMS message transmitted with information composed of only simple letters or numbers, and/or a multimedia message services (MMS) message transmitted with information composed of pictures, music, moving images, and etc. MMS is for transmitting and receiving a multimedia message. The multimedia message can include one or any combination of formatted text, images, pictures, audio, and a video clip.

Accordingly, as technology advances, such as a camera attached to the MS, a liquid crystal, a sound card inside the MS, and etc., the MMS message may become more widely used.

SUMMARY OF THE INVENTION

An object of embodiments of the present invention is to solve at least the above problems and/or disadvantages and to provide at least the advantages described hereinafter.

Embodiments of the present invention may provide a method for receiving/transmitting a wireless message in a mobile telecommunication system. This may allow transmitting a MMS notification message (composed of two SMS messages) to a user without a time delay or without any real time delay. The message transmitting/receiving method may occur between a base station that connects and releases a radio resource (RR) at the time of sending a SMS message and a GSM MS.

Embodiments of the present invention may provide a method for receiving a wireless message in a mobile telecommunication system capable of removing message reception delay by use of a flag setting.

Embodiments of the present invention may provide a method for receiving a wireless message in a mobile telecommunication system. This may include receiving a message at a MS from a base station and judging a kind (or type) of the received message. The message may be processed based on the judged kind of received message. The message may be stored and the user may be informed of the message reception. The message may be a SMS message or a SMS message relevant to a MMS, for example.

Embodiments of the present invention may judge whether the received SMS message is a SMS message constituting a MMS notification or a general SMS message. This judgment may be performed based on data in a header of the message, for example.

Processing the received message may include directly storing a message by a MS and then informing a user if it is a general SMS message. A second message may be received when the SMS message is a MMS notification message. A first SMS message and a second SMS message of a MMS notification message may each be decoded and then combined into one message. A flag setting may be released for the RAU processing and RAU processing may be performed after the RR connection is released.

The foregoing and other objects, features, aspects, advantages and embodiments of the present invention may become more apparent from the following detailed description when taken in conjunction with the accompanying drawings.

BRIEF DESCRIPTION OF THE DRAWINGS

The accompanying drawings are included to provide a further understanding of embodiments of the invention and are incorporated in and constitute a part of this specification.

The following represents brief descriptions of the drawings in which like reference numerals represent like elements and wherein.

DETAILED DESCRIPTION OF PREFERRED EMBODIMENTS

Figure 1:
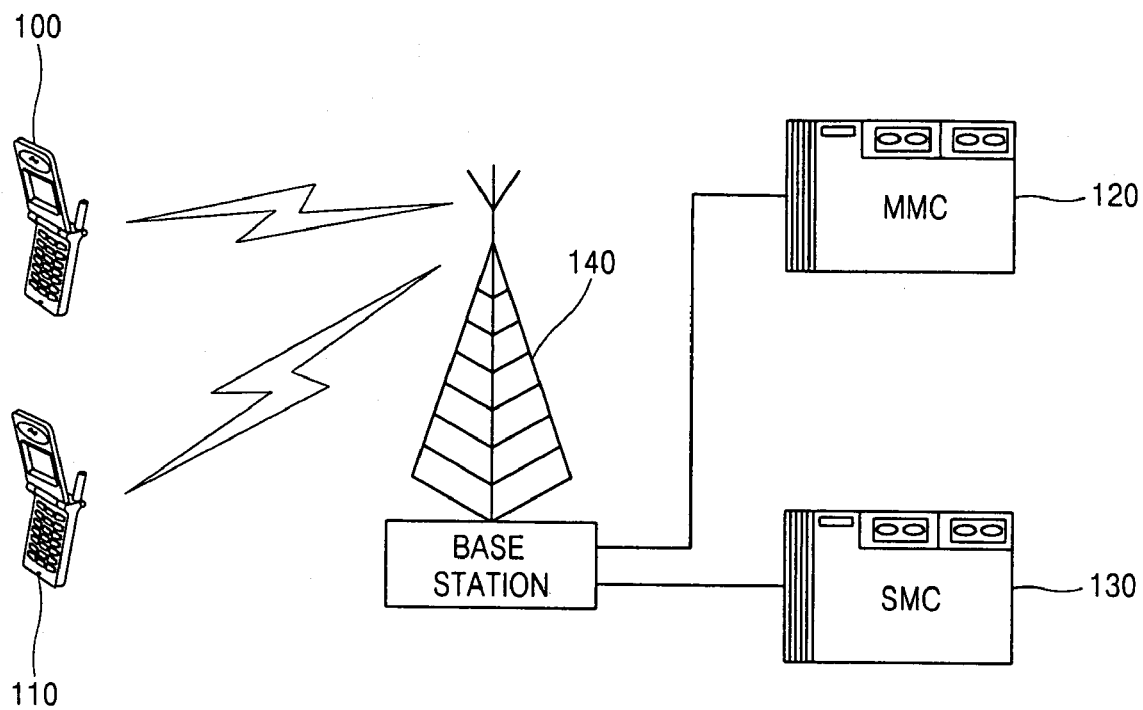
FIG. 1 is a drawing showing a system capable of transmitting/receiving a MMS message according to an example arrangement.

FIG. 1 is a drawing showing a system capable of transmitting/receiving a MMS message in the GSM/general packet radio service (GPRS) network according to an example arrangement. Other arrangements are also possible.

The system for transmitting/receiving a MMS message in the GSM/GPRS network may include GSM mobile stations (MSs) 100 and 110, a MMS message center (MMC) 120, a SMC 130 and a base station 140. The GSM MSs 100 and 110 may transmit and/or receive a MMS message. The MMS message center (MMC) 120 may store a MMS message. The SMC 130 may store a SMS message. The base station 140 may store a message received from the GSM MS 100 in the MMC 120 or the SMC 130. The base station 140 may also transmit a message stored in the MMC 120 or the SMC 130 to the GSM MS 100 or 110.

A MMS message may be created in the GSM MS 100 and then transmitted to the base station 140. The base station 140 may receive the MMS message and store the message in the MMC 120. The MMS message is stored in the MMC 120 via a packet path. Then, the MMC 120 may generate the received MMS message into a notification message composed of two SMS messages. The MMC 120 may transmit the generated notification message to the SMC 130. The SMC 130 receives and stores the notification message. The SMC 130 transmits the notification message composed of two SMS messages through the base station 140 to the receiving GSM MS 110. In the GSM/GPRS network, the MMS message can be transmitted using a MMS-receivable MS. The receiving GSM MS 110 may inform the user of a normal MMS notification message reception by receiving the two SMS messages constituting the notification message. The notification message may be transmitted to the receiving GSM MS.

For example, one method of transmitting the notification message is to consecutively transmit two SMS messages (constituting the notification message) to the receiving MS under a state of a radio resource (RR) connection between the base station and the MS.

Another method is to transmit a first SMS message constituting the notification message to the receiving MS under a state of the RR connected between the base station and the MS, and then to release the RR connection. A second SMS message constituting the notification message may then be transmitted under a reconnection RR state between the base station and the MS.

In the method for consecutively connecting and disconnecting the RR whenever the SMS message for the MMS message is to be transmitted, the MS may perform a routing area update (RAU) when the RR is disconnected after the first SMS message for the MMS message is received. Therefore, when the RR is again reconnected and the second SMS message is received, the MS may not receive a paging signal for the second SMS message transmitted from the base station. Accordingly, a time delay of up to 5 minutes to 10 minutes, for example, may occur, which causes inconvenience to the user. This is because the MS uses a packet data traffic channel (PDTCH) at the time of performing the RAU and does not monitor a common control channel (CCCH) such as a paging channel. Due to the time delay, reliability of the network and the communication service providing company may be degraded. Additionally, due to the time delay, overlapping messages may be transmitted causing unnecessary waste of radio resources of the base station.

Embodiments of the present invention may provide a method for preventing a time delay at the time of receiving (at a MS) several messages transmitted from a network. This may involve consecutively performing a connection/release of a radio resource (RR) for each message.

Figure 3:
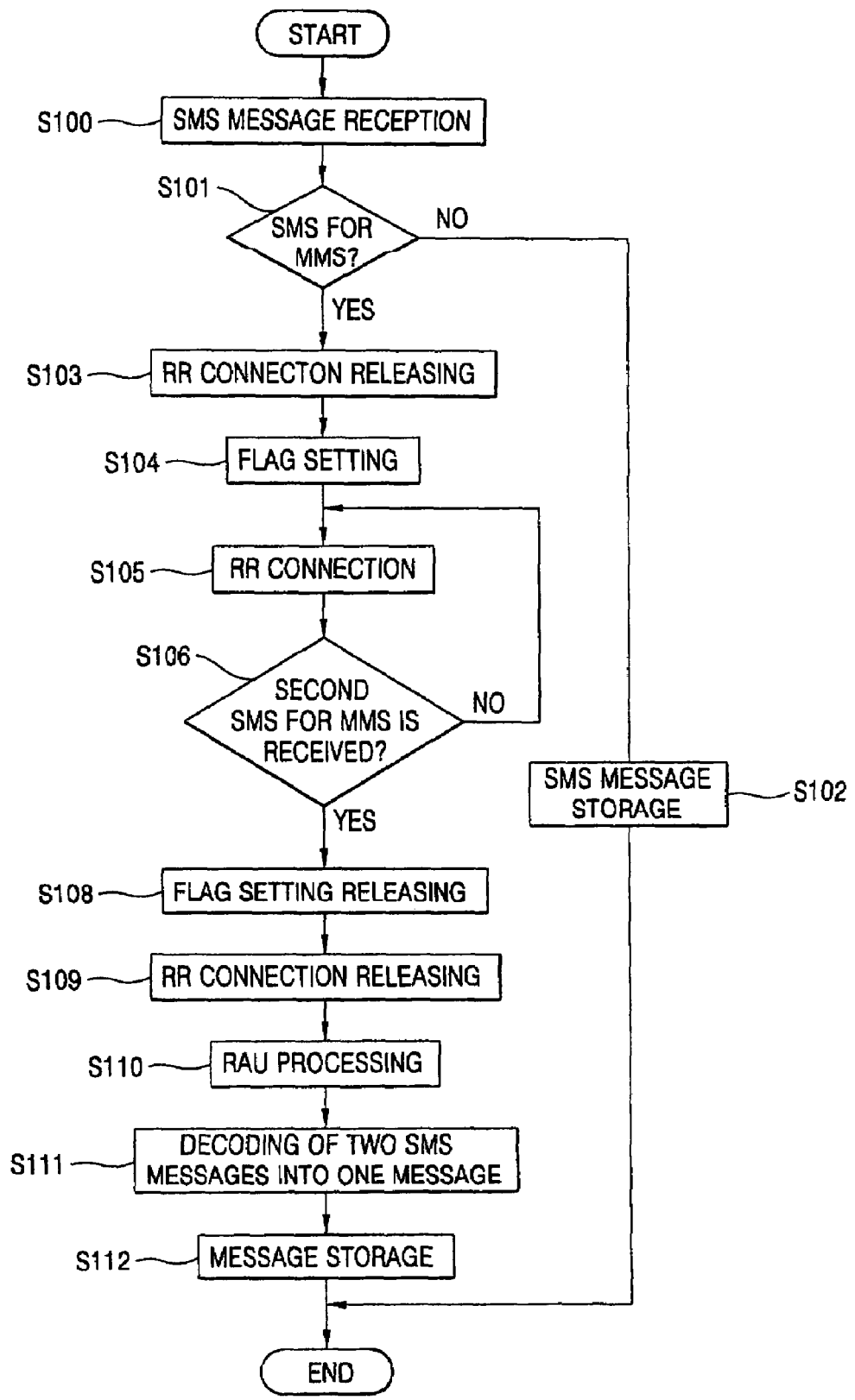
FIG. 3 is a flow chart showing a method for receiving a MMS message according to an example embodiment of the present invention.

FIG. 3 is a flow chart showing a method for receiving a MMS message according to an example embodiment of the present invention. Other operations, orders of operations and embodiments are also within the scope of the present invention.

As shown in FIG. 3, a SMS message may be transmitted from a network and received at a MS (S100). Then, it may be determined whether the SMS message is a MMS notification message (S101). When the SMS message is the notification MMS message rather than a general SMS message, the message may be stored and message reception may be informed to the user (S102). When the SMS message is a first SMS message of a MMS notification message, a RR connection may be released (S103). A flag setting may then be performed (S104) and the RR may be connected again (S105). It may be determined whether a second SMS message of a MMS notification message is received (S106). If the second SMS message has not been received yet, the RR connection may be repeated. When it is determined that the second SMS message of the MMS notification message has been received, the flag setting may be released (S108). Then, the RR connection may be released (S109), and a RAU processing may be performed (S110). The first SMS message and the second SMS message may be decoded and formed into one message (S111). The one MMS notification message may be stored (S112).

In a GSM/GPRS network, when a MMS message is sent to a MS where GPRS and MMS are possible, the MMS message may have been transmitted to a MMS server through a packet path. The transmitted MMS message may not be directly transmitted to the other party. The MMC may make a notification message in order to transmit to a SMC and then the transmitted notification message may be transmitted to the MS of the other party. The notification message generated in the MMC may be composed of two SMS messages, for example. Thus, the receiving MS has to receive both of the two SMS messages for a normal MMS notification to the user.

Figure 2:
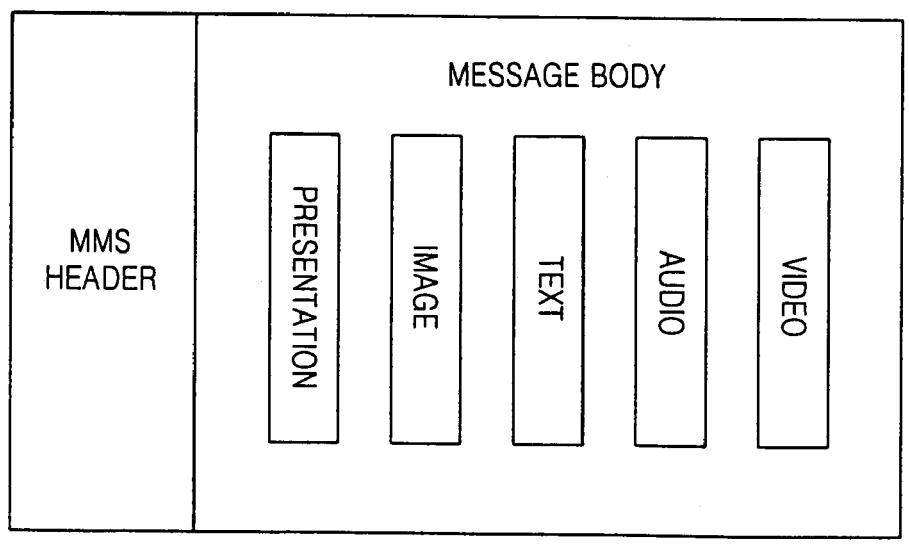
FIG. 2 is a drawing showing a format of a MMS message.

In case that the RR is connected or released for each message when the two SMS messages are to be transmitted through the network, a receiving method according to embodiments of the present invention may be performed. When a first SMS message is received, it is determined whether the message is a first SMS message of a MMS notification message (transmitted from a MMC) or whether the message is a general SMS message. If the message is a general SMS message, the MS may directly store the message and inform the user of message reception using a message reception sound, for example. The determination (or judgment) of the SMS message for the MMS can be performed based on data within the header of a message, such as shown in FIG. 2, for example. The header may provide routing information and addresses for a receiver and a transmitter of the MMS message.

When the first SMS message of a MMS notification message has been received, a flag setting may be performed in a SMS entity. The flag setting, which may be a Boolean variable, may restrain the RAU processing operated for GPRS to enable the MS to monitor a paging channel during the RAU processing. This may prevent a time delay as in disadvantageous arrangements. The MS may receive a second SMS message of a MMS notification message without a time delay. Then, the two received SMS messages may be decoded and formed into one MMS notification message. The MS may store the MMS notification message and inform the user of MMS message reception. The flag setting may be released so that the RAU processing may be performed after the RR is released.

As stated above, the MMS notification message composed of two SMS messages may be transmitted to the user without any delay (or any relative delay). Because there is no time delay (or no relative time delay) in the message reception, service reliability may be provided to the user so as to enhance service quality.

Further, the waste of radio resources resulting from a message retransmission that lasts during the time delay in a message reception may be prevented. This may therefore save resources.

Embodiments of the present invention may be embodied in several forms without departing from the spirit or essential characteristics thereof. It should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for receiving a wireless message in a mobile telecommunication system comprising:
   receiving a first short message service (SMS) message of a multimedia message service (MMS) notification message at a mobile station (MS);
   performing a flag setting in the MS after receiving the first SMS message of the MMS notification message, the flag setting to restrain routing area update (RAU) processing and to allow the MS to monitor a paging channel;
   receiving a second SMS message of the MMS notification message at the MS while the flag setting restrains the RAU processing and while the MS is monitoring the paging channel, wherein performing the flag setting occurs prior to receiving the second SMS message at the MS, the second SMS message of the MMS notification message being different than the first SMS message of the MMS notification message;
   releasing the flag setting in response to receiving the second SMS message at the MS;
   performing the RAU processing in response to releasing the flag setting; and
   after performing the RAU processing, forming one MMS notification message at the MS from the received first SMS message and the received second SMS message, wherein the RAU processing is prevented from being performed when the flag is set.

2. The method of claim 1, wherein the mobile telecommunication system comprises one of a GSM based system and a GPRS based system.

3. The method of claim 1, further comprising storing the SMS message in the MS and then informing a user of a message reception when the SMS message is not a SMS message of a MMS message.

4. The method of claim 1, further comprising determining whether the SMS message is a general SMS message or a MMS notification message based on data included in a header of the first SMS message received at the MS.

5. The method of claim 1, wherein the flag setting comprises a Boolean function performed in a SMS entity.

6. The method of claim 1, further comprising storing the one MMS notification message in the MS.

7. The method of claim 1, further comprising dividing the MMS notification message into the first SMS message and the second SMS message prior to receiving the first SMS message at the MS.

8. A method for receiving a wireless message in a mobile station that receives first and second SMS messages constituting one MMS notification message from a network through different radio resource connections, wherein a routing area update (RAU) is controlled based on the received first and second SMS messages of the one MMS notification message and based on a flag setting of the mobile station, wherein the RAU is prevented from being performed at a time of the flag setting and while the mobile station monitors a paging channel during the time of the flag setting, and the RAU is performed after changing the flag setting in response to receiving the second one of the two SMS messages constituting the one MMS notification message, wherein the flag setting occurs after receiving the first one of the two SMS messages constituting the one MMS notification message and the flag setting occurs prior to receiving the second one of the two SMS messages constituting the one MMS notification message.

9. The method of claim 8, wherein the flag setting comprises a Boolean function.

10. The method of claim 8, wherein the network comprises a radio network based on one of a GSM and a GPRS.

11. The method of claim 8, further comprising dividing the MMS notification message into the first one of two SMS messages and the second one of the two SMS messages prior to receiving the first one of the two SMS messages.

12. The method of claim 8, wherein the first one of the two SMS messages is different than the second one of the two SMS messages.

13. A method for receiving a wireless message in a mobile station that receives two SMS messages constituting one MMS notification message from a wireless system, the method comprising:
   receiving a first SMS message of the one MMS notification message at a mobile station;
   releasing a radio resource (RR) connection in response to receiving the first SMS message;
   setting a flag when the RR connection is released and the mobile station to monitor a paging channel while the flag is set;
   receiving a second SMS message of the one MMS notification message at the mobile station while the flag is set and while the mobile station is monitoring the paging channel;
   releasing the setting of the flag in response to receiving the second SMS message at the MS, wherein setting the flag occurs after receiving the first SMS message at the mobile station and prior to receiving the second SMS message at the mobile station;
   performing the RAU processing in response to releasing the setting of the flag; and
   after performing the RAU processing, forming the one MMS notification message at the mobile station from the received first SMS message and the received second SMS message, wherein the RAU processing is prevented from being performed when the flag is set.

14. The method of claim 13, further comprising reperforming the RR connection after setting the flag.

15. The method of claim 13, wherein the wireless system comprises one of a system based on a GSM and a GPRS.

16. The method of claim 13, wherein setting the flag comprises a Boolean function performed in a SMS entity.

17. The method of claim 13, further comprising dividing the MMS notification message into the first SMS message and the second SMS message prior to receiving the first SMS message at the mobile station.

18. A method of communicating in a mobile telecommunication system comprising:
   receiving a first SMS message at a mobile terminal;
   determining whether the first SMS message comprises part of a MMS notification message;
   releasing a radio resource connection when the first SMS message is determined to be part of the MMS notification message;
   setting a flag based on the determination regarding the first SMS message, wherein when the flag is set, the mobile terminal to monitor a paging channel;
   while the mobile terminal monitoring the paging channel, receiving a second SMS message at the mobile terminal, the second SMS message being another part of the MMS notification message;
   releasing the flag setting after receiving the second SMS message at the mobile terminal, wherein when the flag is released, the mobile terminal no longer monitors the paging channel;

performing a routing area update (RAU) processing in response to releasing the flag setting;

decoding the first SMS message and the second SMS message; and after performing the RAU processing, forming a single message at the mobile terminal based on the decoded first SMS message and the decoded second SMS message, wherein the RAU processing is prevented from being performed when the flag is set.

19. The method of claim 18, wherein setting the flag occurs prior to receiving the second SMS message.

20. The method of claim 18, further comprising dividing the MMS notification message into the first SMS message and the second SMS message prior to receiving the first SMS message at the mobile terminal.

21. The method of claim 20, wherein the first SMS message is different than the second SMS message.

* * * * *